United States Patent
Athanasiou

(10) Patent No.: US 10,946,925 B2
(45) Date of Patent: Mar. 16, 2021

(54) MULTI POSITIONAL ROTARY STEERING DAMPER ASSEMBLY

(71) Applicant: George John Athanasiou, Lodi, CA (US)

(72) Inventor: George John Athanasiou, Lodi, CA (US)

(73) Assignee: George John Athanasiou, Lodi, CA (US)

( * ) Notice: Subject to any disclaimer, the term of this patent is extended or adjusted under 35 U.S.C. 154(b) by 393 days.

(21) Appl. No.: 15/842,474

(22) Filed: Dec. 14, 2017

(65) Prior Publication Data

US 2019/0185103 A1 Jun. 20, 2019

(51) Int. Cl.
*B62K 21/08* (2006.01)
*B62K 21/18* (2006.01)

(52) U.S. Cl.
CPC .............. *B62K 21/08* (2013.01); *B62K 21/18* (2013.01)

(58) Field of Classification Search
CPC .................................. B62K 21/08; B62K 21/18
See application file for complete search history.

(56) References Cited

U.S. PATENT DOCUMENTS

| | | | |
|---|---|---|---|
| 4,773,514 A * | 9/1988 | Gustafsson | B62K 21/08 188/306 |
| 6,802,519 B2 | 10/2004 | Morgan | |
| 7,258,356 B2 * | 8/2007 | Okazaki | B62K 21/08 188/290 |
| 7,390,004 B2 | 6/2008 | Gogo | |
| 7,510,063 B2 | 3/2009 | Norman | |
| 7,644,642 B2 | 1/2010 | Paris | |
| 7,726,677 B2 * | 6/2010 | Fujita | B62K 21/08 188/290 |
| 7,891,681 B2 | 2/2011 | Gustafsson | |
| 2003/0136621 A1 * | 7/2003 | Norman | F16F 9/145 188/310 |
| 2004/0046351 A1 * | 3/2004 | Morgan | B62K 21/08 280/272 |
| 2004/0239069 A1 * | 12/2004 | Yamada | B62K 21/08 280/272 |
| 2006/0207845 A1 * | 9/2006 | Gogo | B62K 21/08 188/290 |
| 2006/0220340 A1 * | 10/2006 | Seki | B62K 21/08 280/272 |
| 2007/0045982 A1 * | 3/2007 | Tomonaga | B62K 21/08 280/272 |
| 2008/0105506 A1 * | 5/2008 | Norman | B62K 21/08 188/310 |
| 2009/0198411 A1 * | 8/2009 | Kohls | B62D 7/224 701/36 |

FOREIGN PATENT DOCUMENTS

| | | |
|---|---|---|
| EP | 1375328 B1 | 2/2004 |
| JP | 2005082038 A | 3/2005 |
| JP | 2006123888 B2 | 5/2006 |

\* cited by examiner

*Primary Examiner* — Tony H Winner

(57) ABSTRACT

A hydraulic rotary steering damper with articulate linkage to enable mounting to a vehicle's steering mechanism coaxially, non-coaxially, or at an angle to the axis of steering rotation of the vehicle with the option of a hinged frame mount to attach to a vehicle's frame for the purpose of linking the steering damper to the vehicle's frame.

29 Claims, 15 Drawing Sheets

MULTI POSITIONAL ROTARY STEERING DAMPER ASSEMBLY

BACKGROUND FIELD

Field of this Embodiment

This application relates to steering mechanism mounted rotary steering dampers of vehicles with handlebar assisted steering such as motorcycles, bicycles, and all-terrain vehicles.

Background Prior Art

The beneficial effects of steering clamping have been appreciated for many years. Steering dampers provide a damping of rotational forces on a vehicle's steering mechanism, which are caused by bumps and obstacles in the path of the vehicle, and they reduce harmonic transfer from the vehicle's steering to the vehicle's frame. Steering dampers attenuate the physically exhausting effects of riding vehicles under rigorous conditions. Historically, great efforts were made to mount rotary steering dampers as close to perfectly coaxial to the vehicle's steering mechanism as possible, this enabled a synchronized one to one steering ratio of the damper with the vehicle's steering mechanism, without the use of dangerous linkages. For most off-road vehicles, coaxial mounting has two options: mounting the steering damper above or below the handlebar. U.S. Pat. No. 7,510,063B2 granted 2010 Jan. 12 to Joshua A. Paris discloses a complex method for keeping the rotary damper coaxial to the vehicle's steering by using an adjustable steering damper mount that mounts the steering damper above the handlebar. Mounting above the handlebar puts the damper in a dangerous position. In the event the rider hits an obstacle that sends the rider forward, there is sometimes an injury upon impact with the damper. Other downfalls of this design are a higher center of gravity and a long damper to frame leverage ratio.

The second option is to mount the rotary steering damper below the handlebar. This method is disclosed in U.S. Pat. No. 7,510,063B2 granted 2009 Mar. 31 to Ralph S. Norman. This art shows the rotary steering damper mounted below the handlebar. In many cases, this raises the handlebar significantly. The raising of the handlebar from where the manufacturer intended them or from where the rider is most comfortable is not preferable.

In order not to raise the handlebar or mount the steering damper on top of the handlebar, parallel mounting, rather than coaxial mounting, of the damper's axis of rotation relative to the vehicle's axis of rotation can be accomplished with linkages, as shown by U.S. Pat. No. 7,390,004B2 date 2008-06-24 to Kazuhiko Gogo. This art shows the use of linkages that could scissor a finger or other body part, or have impact with the rider and possibly cause injury. The use of the linkage shown will not maintain a one to one ratio between the damper and the vehicle's steering mechanism, and a long damper to frame leverage ratio also exists.

In order not to raise the handlebar, vehicles can have expensive parts replaced with modified components that can house a steering damper with coaxial alignment to the vehicle's steering mechanism as disclosed by U.S. Pat. No. 6,802,519B2 date 2004-10-12 to Jason J. Morgan. This option requires an expensive new triple clamp component and a time consuming disassembly and reassembly of the steering mechanism by a skilled person. Another such example that is also time consuming to a skilled person and requires expensive parts to be replaced to place the steering damper with coaxial alignment to the vehicle's steering mechanism is disclosed by U.S. Pat. No. 7,891,681B2 date 2011-02-22 to Leif Gustafsson. This embodiment is slimmer than most but will still need the handlebar raised on some vehicles. Both of these embodiments need parts that are very specific to vehicle makes and models making them less practical, more expensive, and less available.

Skilled riders have long wanted a rotary steering damper that does not raise their handlebar, is not located in a position that is more likely to cause an injury, does not have dangerous scissoring components, does not require a skilled individual a great deal of time to install, does not replace expensive parts, does not overly raise their vehicle's center of gravity, and offers a preferable steering ratio with the vehicle's steering mechanism.

SUMMARY OF THIS EMBODIMENT

It is the objective of this embodiment to provide a steering damper device which is capable of being mounted to a vehicle's steering mechanism with advantageous orientation to the axis of steering rotation of the vehicle: coaxially, non-coaxially, or at an angle to.

DRAWING—FIGURES

In the drawings, closely related figures will have the same number with different alphabetic suffixes. Newly introduced components will have a drawing reference number that begins with the figure number they were introduced in.

Figure 1:
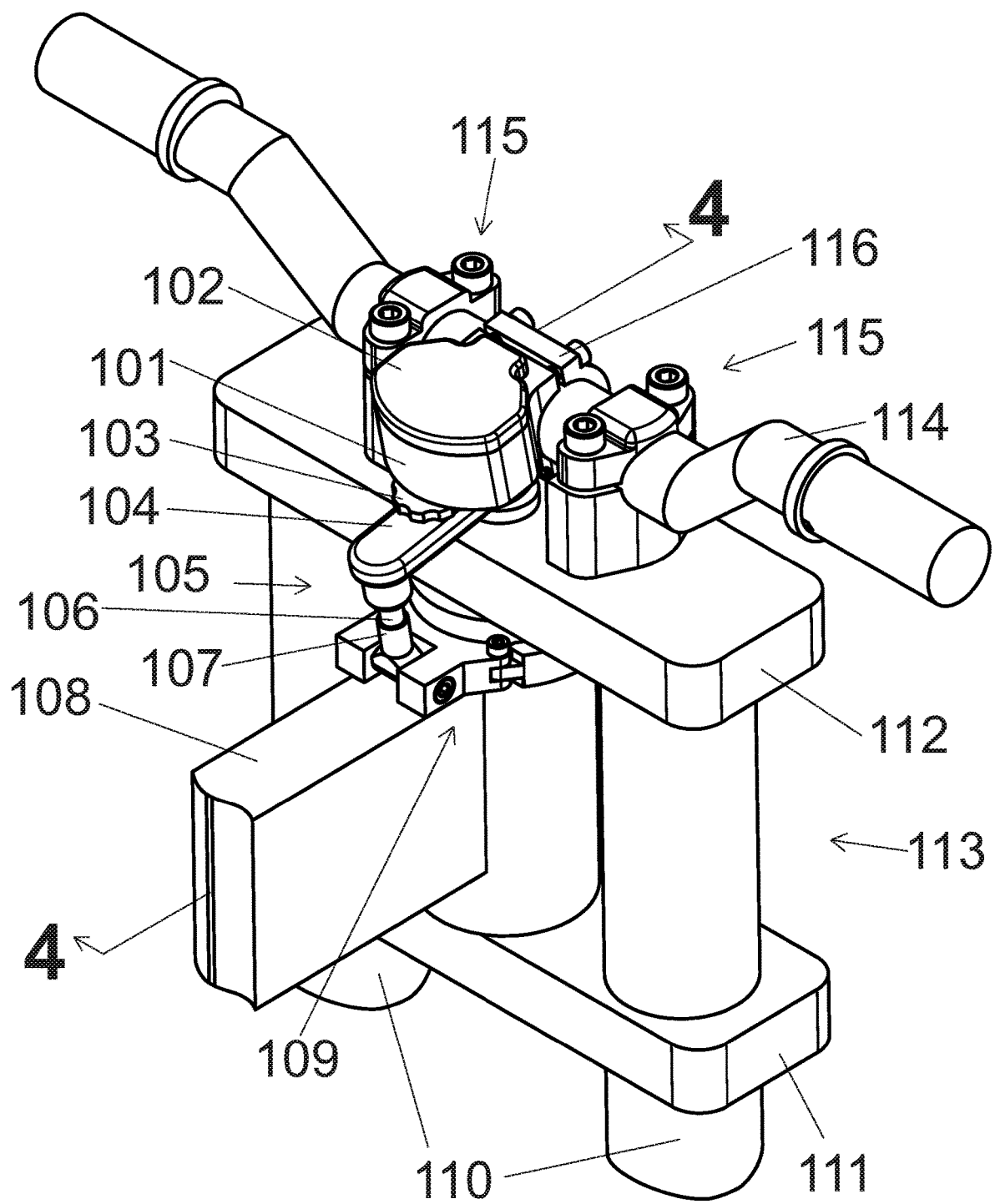
FIG. 1 is a perspective view of the multi position rotary steering damper shown attached to a vehicle's handlebar and a vehicle's frame.

DRAWING—REFERENCE NUMERALS 101) housing
102) cover 103) metering valve
104) lever
105) articulate joint
106) slidable dog pin
107) boss, pivoting
108) vehicle's frame
109) hinged boss frame mounting assembly
110) vehicle's shock tube
111) vehicle's bottom triple clamp
112) vehicle's top triple clamp
113) vehicle's steering mechanism
114) vehicle's handlebar
11.5) vehicle's handlebar clamp assembly
116) clamp, housing
201) hydraulic chamber
202) sub-chamber
203) rotary vane
204) channel
205) recess
301a) aperture, housing
302) cover fastener
303) pin, lever
304a) socket, lever
305) clamp screw
306a) ball end, slidable dog pin
307) bushing, boss pivoting
308) screw, boss pivoting
309) center member
310) left member
311) right member
312a) frame aperture
313) screw pivoting
314) clamping screw
316a) aperture, clamp housing
320b) pin, vane
321b) levered shaft
322b) vane, pinned
401) axis of rotation, rotary vane
402) axis of rotation, vehicle's steering mechanism's
403) axes intersection point
404) center, articulate joint
405) deviation, axes intersection
501a) distance straight
501b) distance turned
601) housing alternative
602) frame mount, boss pivoting
603) pin, pivoting
604) bracket, housing
701) fastener set, bracket
702) locating recess
801) universal joint
802) slidable dog pin, universal
803) lever, universal
901) slidable dog pin, hinged
902) rotating lever pin
904) pivot pin, hinge
905) lever, pinned
1001) bracket mount
1002) screw, bracket
1003) adjustable bracket
1004) holes, bracket
1005) slot, bracket
1006) solid boss
1101) rotating slidable lever pin
1102) lever, rotating slidable pin
1201) boss dog pin
1202) slotted lever end
1203) lever, short
1301) nut
1302) piano hinge
1303) lip
1304) recess, frame
1305) fastener aperture
1401) boss, non-pivoting
1402a) boss aperture

DETAILED DESCRIPTION OF THE EMBODIMENTS

The present embodiments find utility with a number of vehicles, including but without limitation to, motorcycles, all-terrain vehicles (ATVs), snow mobiles, personal watercraft, and other types of vehicles that employ handlebar assemblies to influence steering.

Figure 2:
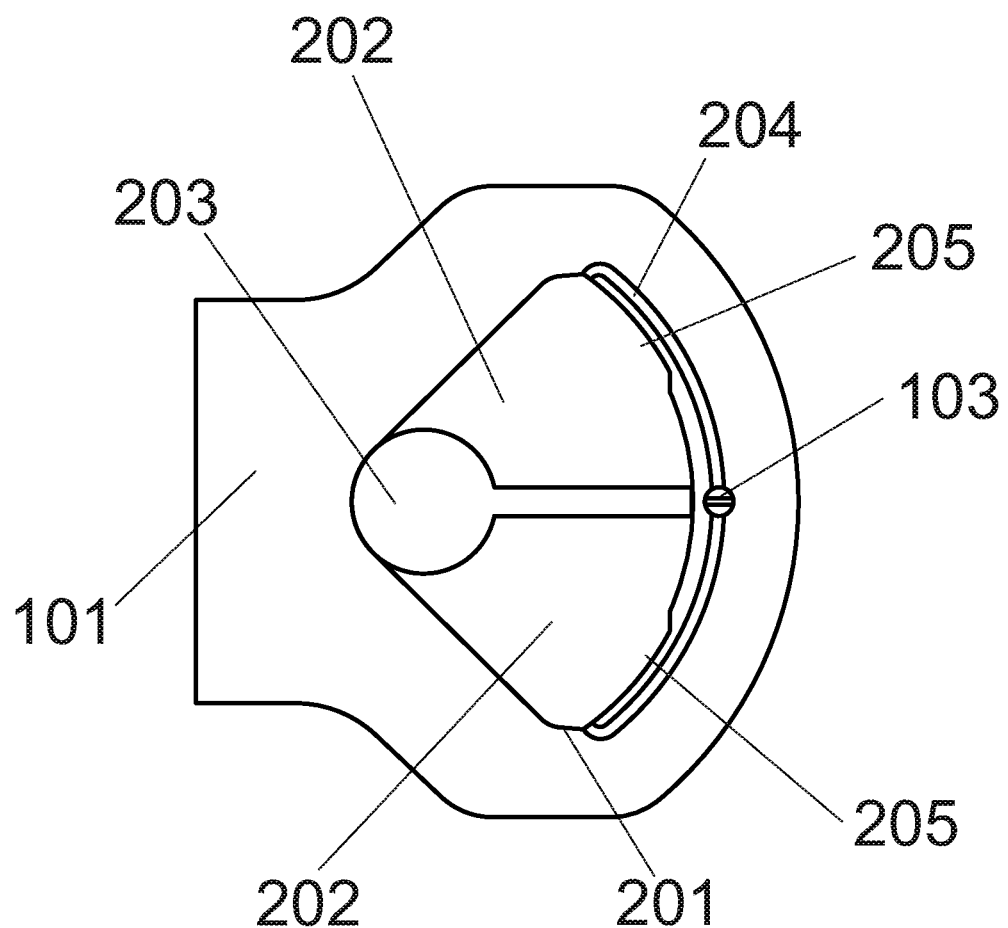
FIG. 2 is a top plan view of the inner working of a rotary vane steering damper.
Figure 3A:
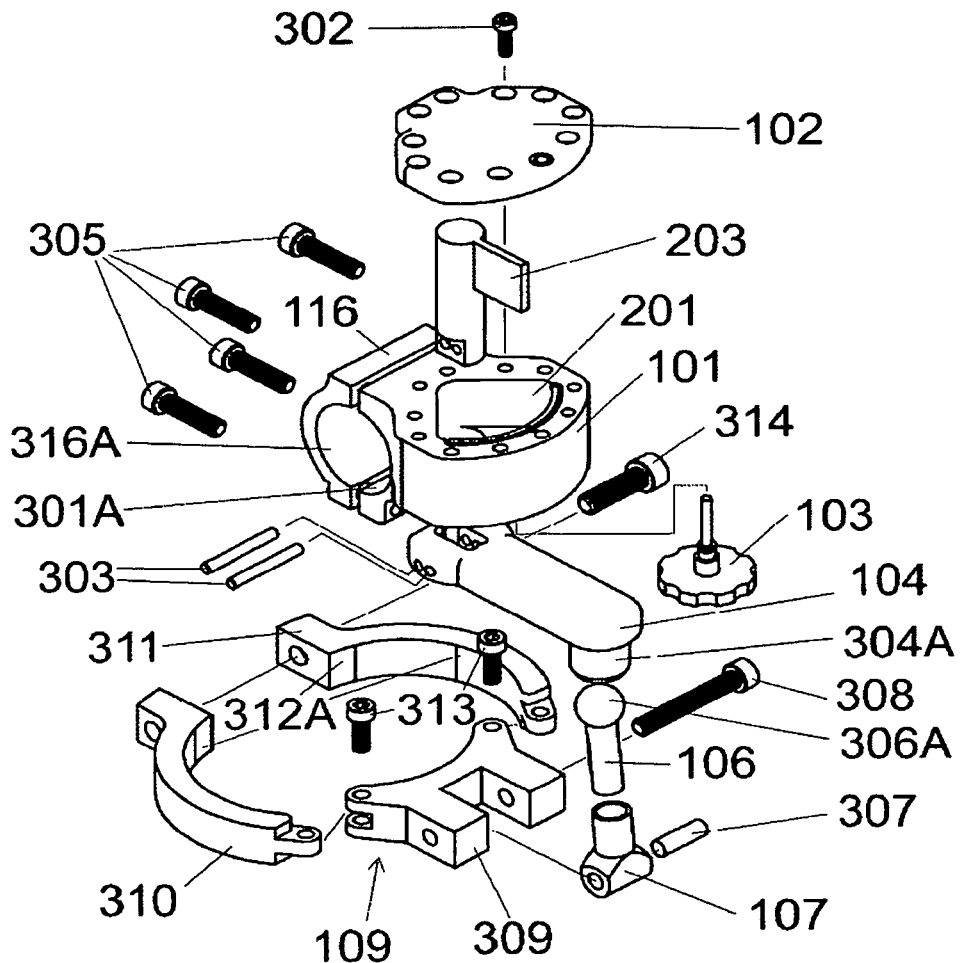
FIG. 3A is an exploded view of a multi position steering damper and a hinged boss frame mounting assembly.

The first embodiment is illustrated in FIGS. 1,2,3A. In FIG. 1, a multi positional rotary steering damper assembly is shown mounted to a vehicle's steering mechanism 113. A housing 101 is attached by a housing clamp 116 to a vehicle's handlebar 114 that is attached to a vehicle's top triple clamp 112 by a vehicle's handlebar clamp assembly 115. A vehicle's shock tube 110 set connects the vehicle's top triple clamp 112 to a vehicle's bottom triple clamp 111 forming the vehicle's steering mechanism 113 which rotates about a vehicle's frame 108.

FIG. 2. Housing 101 with a hydraulic chamber 201 filled with a working fluid therein is divided into a sub-chamber 202 set by a rotary vane 203. Sub-chamber 202 set is connected by a channel 204 allowing the working fluid to pass between the sub-chambers with flow rate controlled by a metering valve 103. This embodiment is shown with the option of a recess 205 set of hydraulic chamber 201. Recess 205 can be any size and positioned on any wall of hydraulic chamber 201.

FIG. 3A. Housing 101 has a housing aperture 301A to accept the vehicle's handlebar 114 (FIG. 1) attached by a clamp housing aperture 316A of housing clamp 116 with a clamp screw 305 set. Hydraulic chamber 201 of housing 101 is hermetically sealed by a cover 102. In this embodiment, a set of cover fasteners 302 (one shown) are used. Other methods of attaching cover 102 are contemplated such as but not limited to adhesive, welding, or integral construction with housing 101. Cover 102 incases the vane portion of rotary vane 203. A shaft of the rotary vane protrudes out of the bottom of housing 101 where a lever 104 is attached to the shall of rotary vane 203 by a lever pin 303 set. In this embodiment, lever pin 303 is a dowel pin for strength and space constraints. Other fasteners or a more permanent attachment may be used.

An articulate joint 105 (FIG. 1) is comprising a slidable dog pin ball end 306A of a slidable dog pin 106 and a lever socket 304A of lever 104. In this embodiment, articulate joint 105 is a trochoid joint, commonly known as a ball joint, that is connected by swaging lever socket 304A around the ball end 306A to restrain but allow articulate motion of the ball end 306A. Other methods of forming ball joints are well-known and ball joints are also readily available for purchase.

Slidable dog pin 106 has a slidable connection to a pivoting boss 107 of a hinged boss frame mounting assembly 109. Pivoting boss 107 is hinged to a center member 309 by a boss pivot bushing 307 and a boss pivot screw 308. Other methods for forming a hinge are contemplated, such as but not limited to a simple pin, a shoulder bolt, or an integral pin manufactured into pivoting boss 107. Pivoting boss 107 can be connected to the vehicle's frame 108 in many ways. In this embodiment, the hinged boss frame mounting assembly 109 is used. Center member 309 has a pivotable connection to a left member 310 and a right member 311 by a screw pivot 313 set. The members 309,310,311 have a frame aperture 312A to receive the vehicle's frame 108. A clamping screw 314 connects left member 310 to right member 311.

Figure 4:
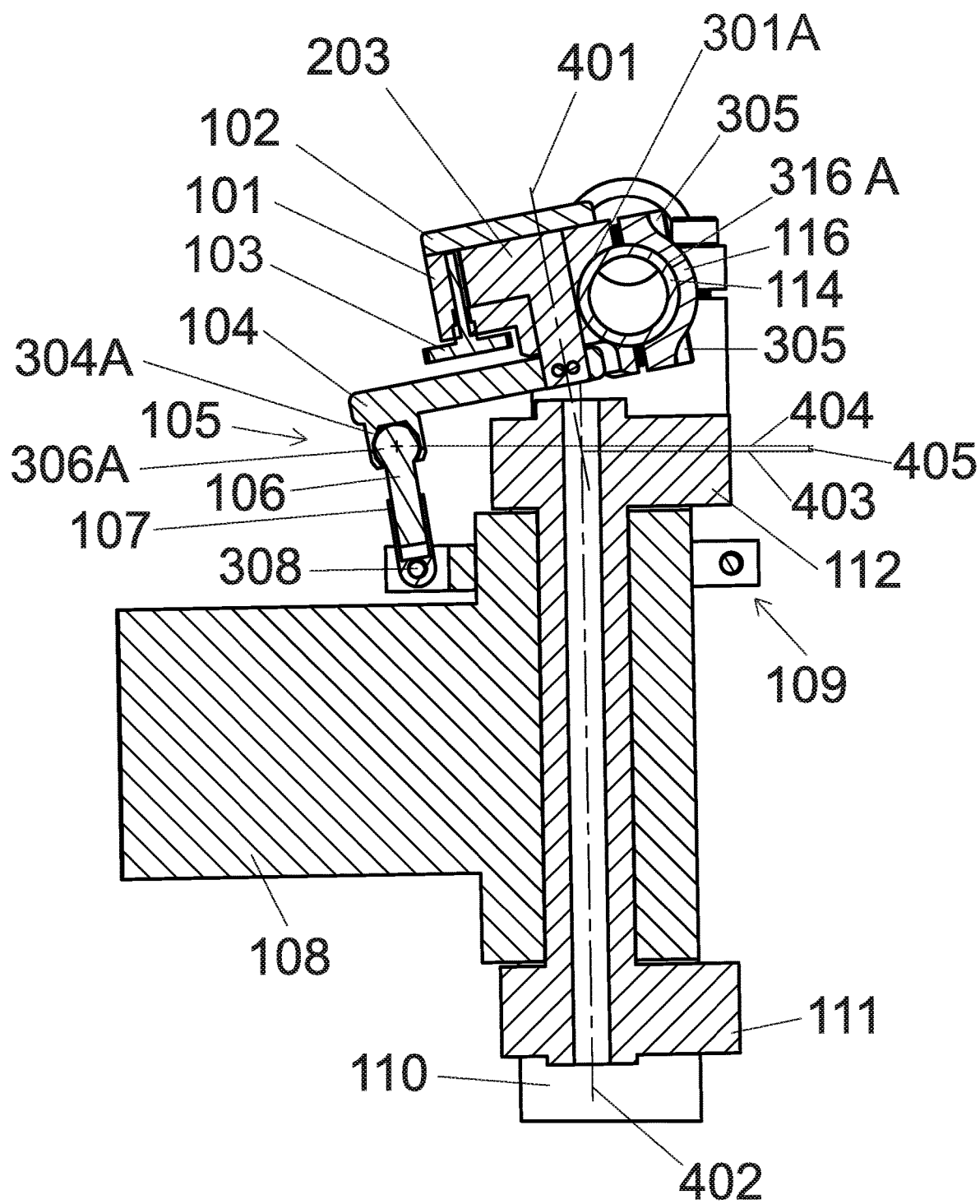
FIG. 4 is a sectional view of FIG. 1 showing geometric alignment of the steering damper and the vehicle.
Figure 5A:
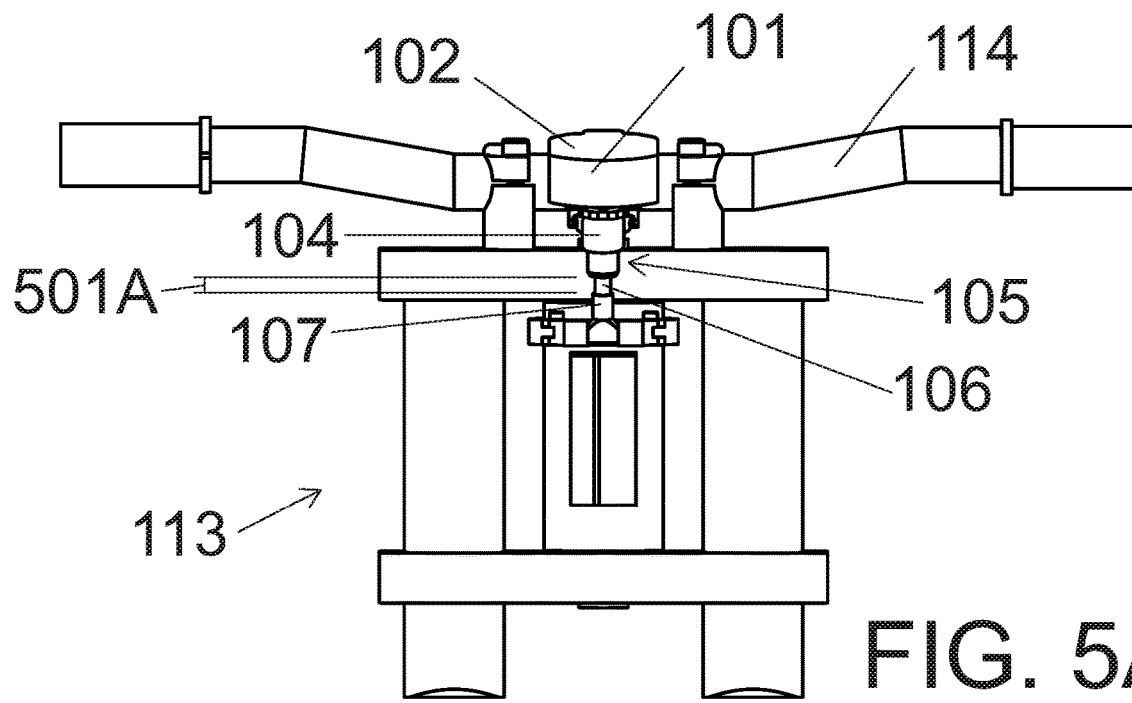
FIG. 5A is a rider's perspective view of FIG. 1.
Figure 5B:
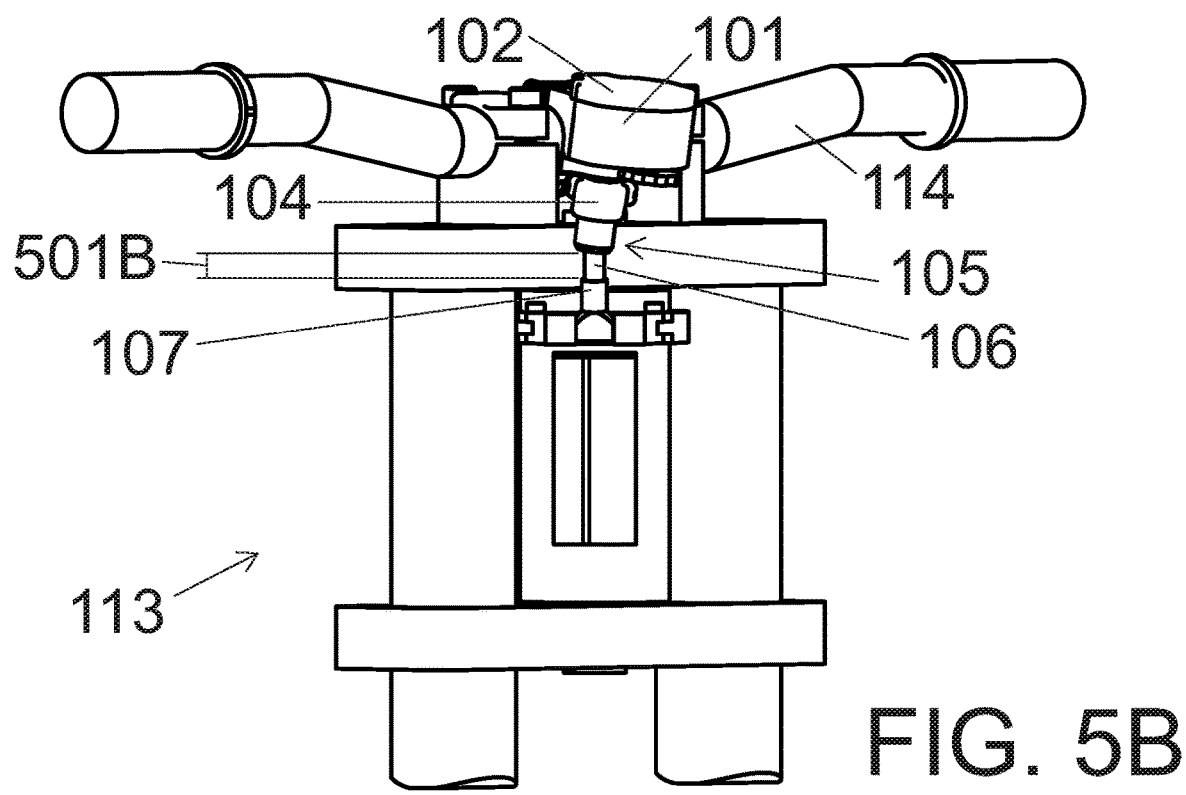
FIG. 5B is a rider's perspective view of FIG. 1 with the vehicle's steering mechanism turned to the left.

One geometric alignment is shown in FIG. 4 where a rotary vane axis of rotation 401 intersects a vehicle's steering mechanism's axis of rotation 402 at an axes intersection point 403. An articulate joint center 404 of articulate joint 105 has an axes intersection deviation 405 distance from axes intersection point 403. In this embodiment, the axes intersection deviation 405 distance is shown with articulate joint center 404 being slightly above the axes intersection point 403 causing rotary vane 203 to rotate more degrees than the vehicle's steering mechanism 113 with approximately 1:1.02 ratio. By loosening clamp screw 305 set and rotating the housing 101, the articulate joint center 404 can be moved to or below the axis intersection point 403, causing rotary vane 203 to rotate fewer degrees than the vehicle's steering mechanism 113, thereby creating a changeable ratio between rotary vane 203 and the vehicle's steering mechanism 113. At the axes deviation distance 405 shown in this embodiment, articulate joint 105 moves toward the vehicle's steering mechanism's axis of rotation 402 upon rotation of the vehicle's steering mechanism 113, while the rotary vane axis of rotation 401 orbits about the vehicle's steering mechanism's axis of rotation 402 in a semi conical. Because lever 104 stays at 90 degrees from the rotary vane axis of rotation 401, articulate joint 105 moves with articulate motion. This is shown in the changes from FIG. 5A, with the vehicle's steering mechanism 113 not turned, to FIG. 5B, where the vehicle's steering mechanism 113 is turned. In FIG. 5B, lever 104 has pitched, articulate joint 105 has moved with articulate motion, pivoting boss 107 has rotated toward the vehicle's steering mechanism's axis of rotation 402, and slidable dog pin 106 has moved slidably outward from pivoting boss 107. This is shown in the comparison of a distance straight 501A to a distance turned 501B. During the rotation of the vehicle's steering mechanism 113 in synchronized motion with rotary vane 203 the rotary vane transfers the working fluid between the sub-chambers with damping force controlled by metering valve 103. Recess 205 set offers an optional reduction of damping force as rotary vane 203 passes over recess 205, thereby creating sectors with less damping in the steering rotation.

Figure 3B:
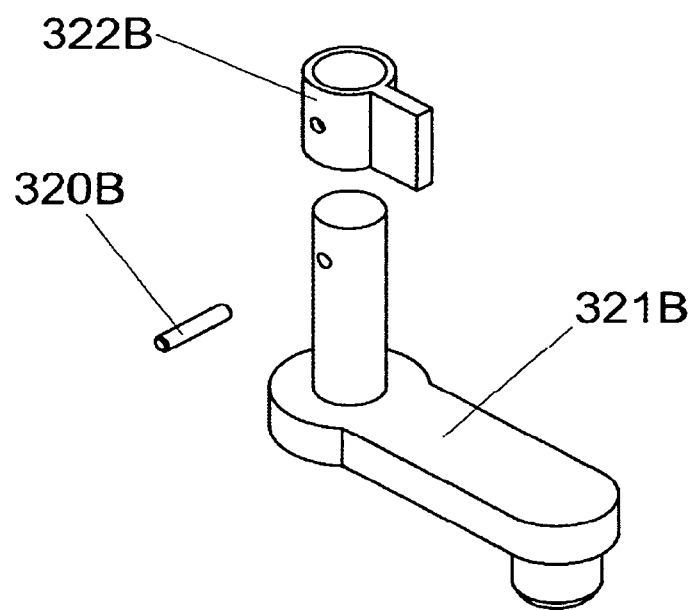
FIG. 3B is an exploded view of integral lever and shall.

The second embodiment is represented in FIG. 3B. This embodiment employs a similar arrangement as the first embodiment represented schematically in FIG. 1, FIG. 2, and FIG. 3A. The changes will be described below; additional or altered parts from the first embodiment are illustrated with part numbers ending with the letter B. In this embodiment, a levered shaft 321B is one integral piece connected to a pinned vane 322B by a vane pin 320B.

Figure 8:
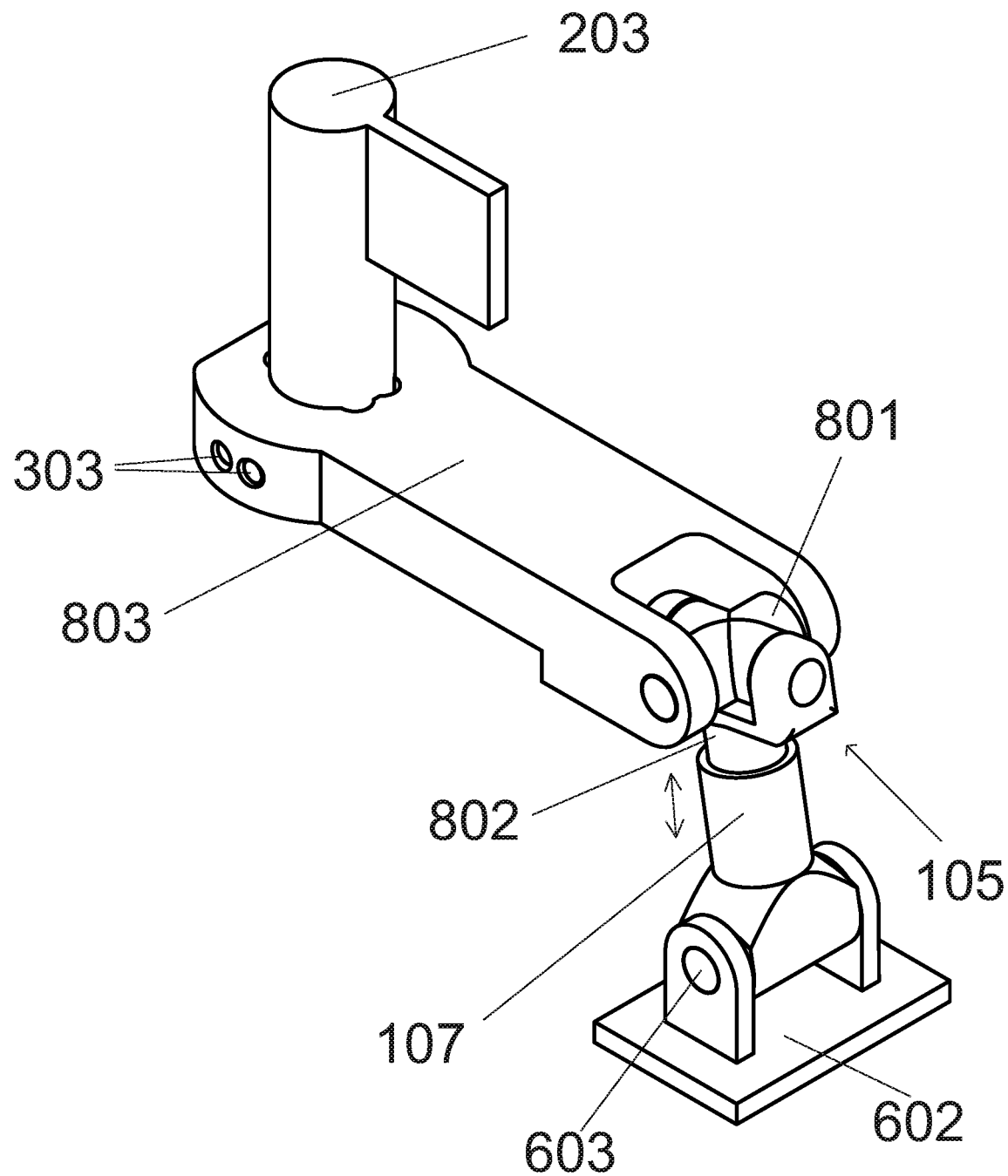
FIG. 8 is a perspective view of an alternative articulate joint connection.

The third embodiment is represented in FIG. 8. This embodiment employs a similar arrangement as the first embodiment represented schematically in FIG. 1, FIG. 2, and FIG. 3A. The changes will be described below; additional or altered parts from the first embodiment are illustrated with part numbers beginning with the number 8. In this embodiment, articulate joint 105 is comprising a universal joint 801 (a well-known bearing) with pivotal connection to a universal lever 803 and a second pivotal connection to a universal slidable dog pin 802 with slidable connection to pivoting boss 107.

Figure 9:
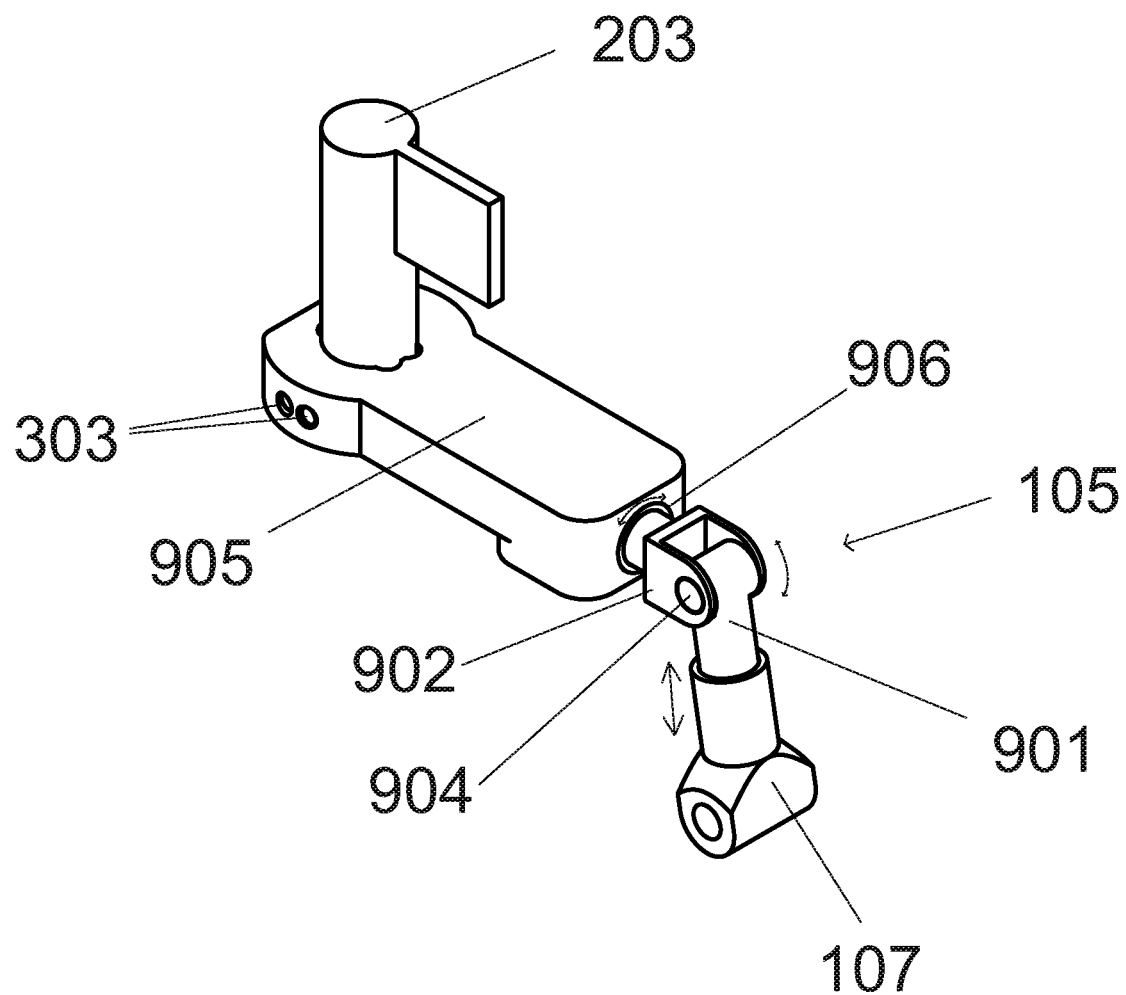
FIG. 9 is a perspective view of another alternative articulate joint connection.

The fourth embodiment is represented in FIG. 9. This embodiment employs a similar arrangement as the first embodiment represented schematically in FIG. 1, FIG. 2, and FIG. 3A The changes will be described below; additional or altered parts from the first embodiment are illustrated with part numbers beginning with the number 9. In this embodiment, articulate joint 105 is comprising a hinged slidable dog pin 901 pivotably connected to a rotating lever pin 902 by a hinge pivot pin 904 and is also rotatably connected to a pinned lever 905 by a bearing 906. Hinged slidable dog pin 901 has a slidable connection to pivoting boss 107.

Figure 12:
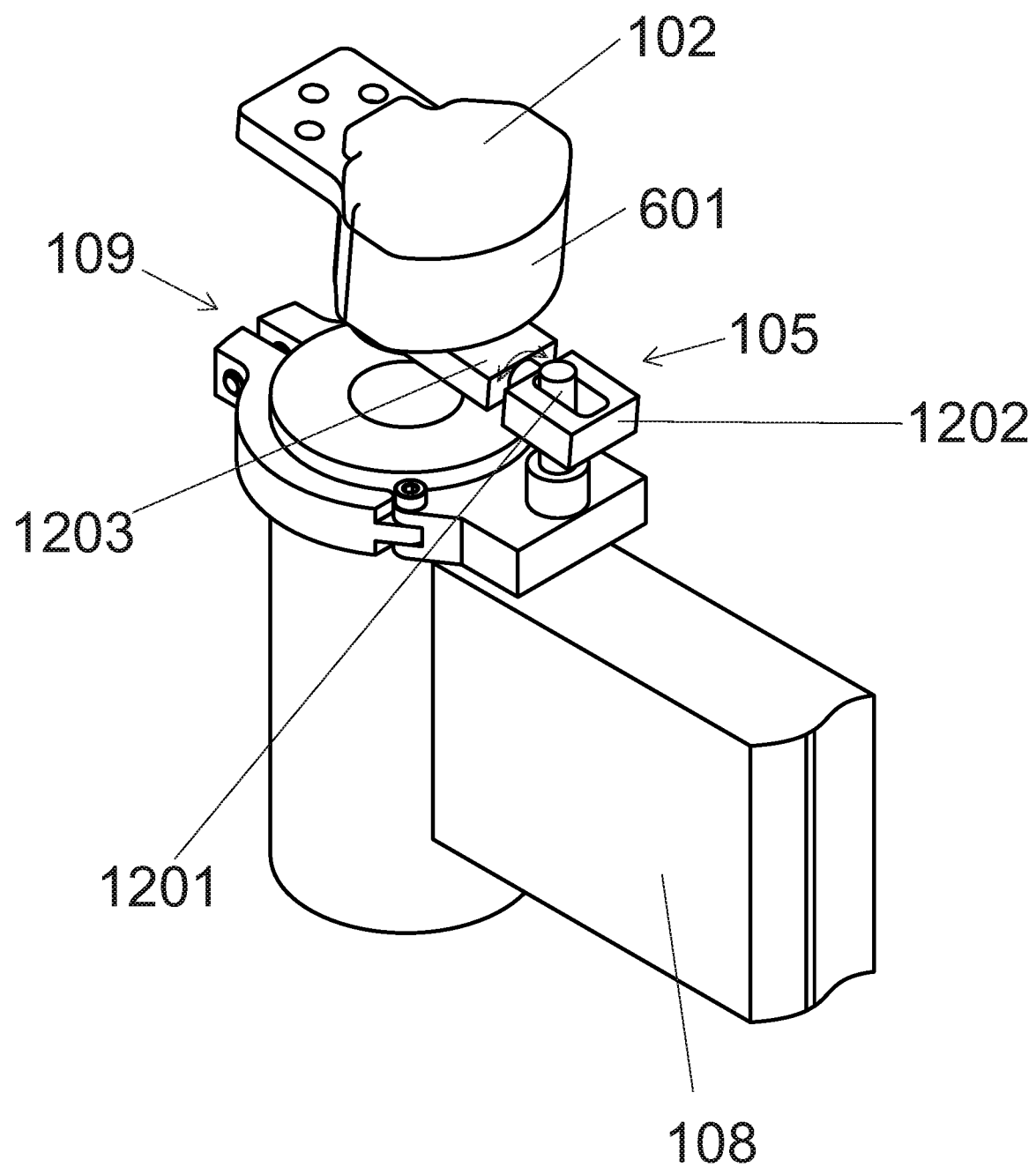
FIG. 12 is a perspective view of the single position rotary steering damper of FIG. 6 with another alternative articulate joint connection.

The fifth embodiment is represented in FIG. 12. This embodiment employs a similar arrangement as the first embodiment represented schematically in FIG. 1. FIG. 2, and FIG. 3A. The changes will be described below; additional or altered parts from the first embodiment are illustrated with 4 digit part numbers beginning with 12. In this embodiment, articulate joint 105 is comprising a boss dog pin 1201 connected slidably in two axes to a slotted lever end 1202. Slotted lever end 1202 is pivotably connected to a short lever 1203.

Figure 10:
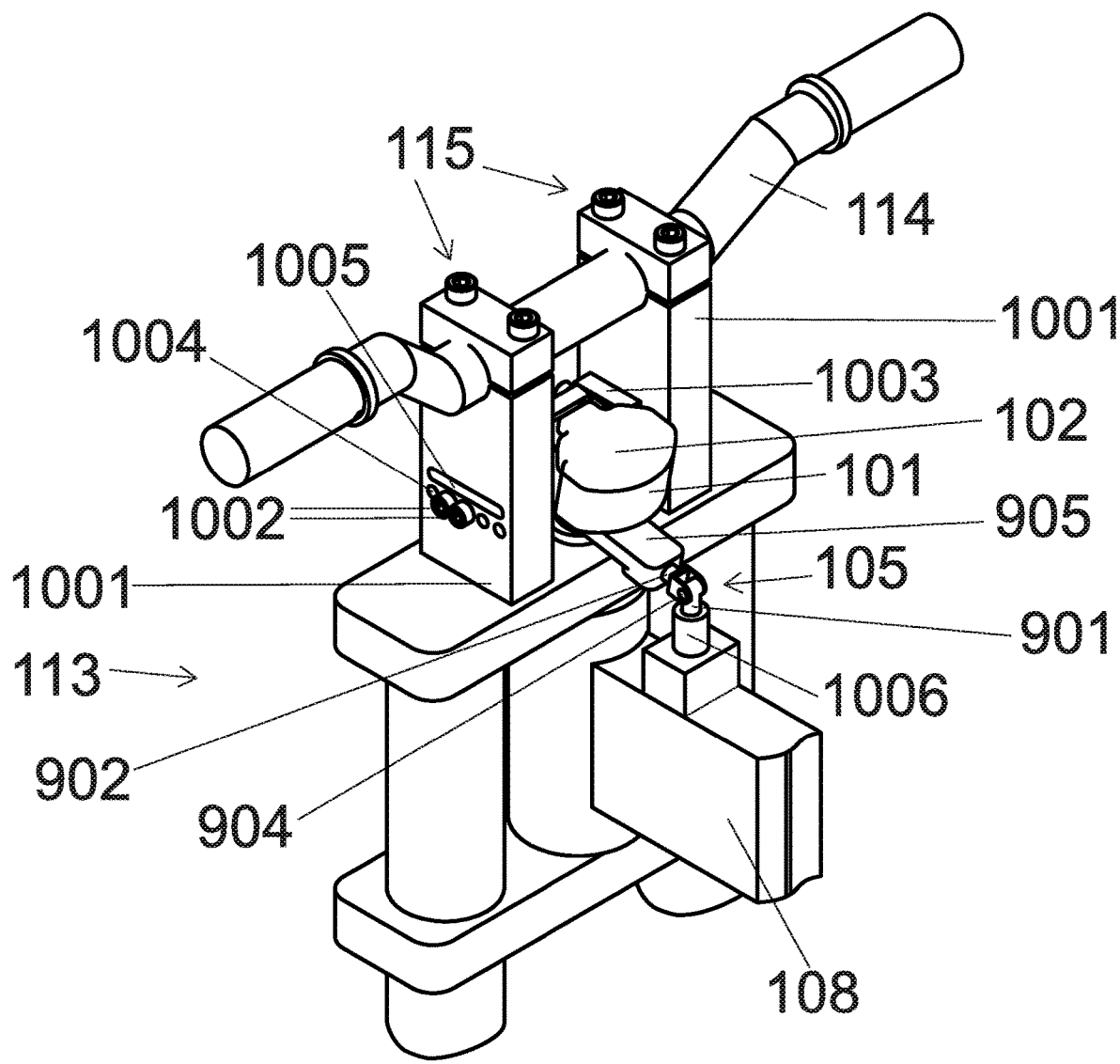
FIG. 10 is a perspective view of an adjustable mount for a multi position steering damper with a solid boss.
Figure 11:
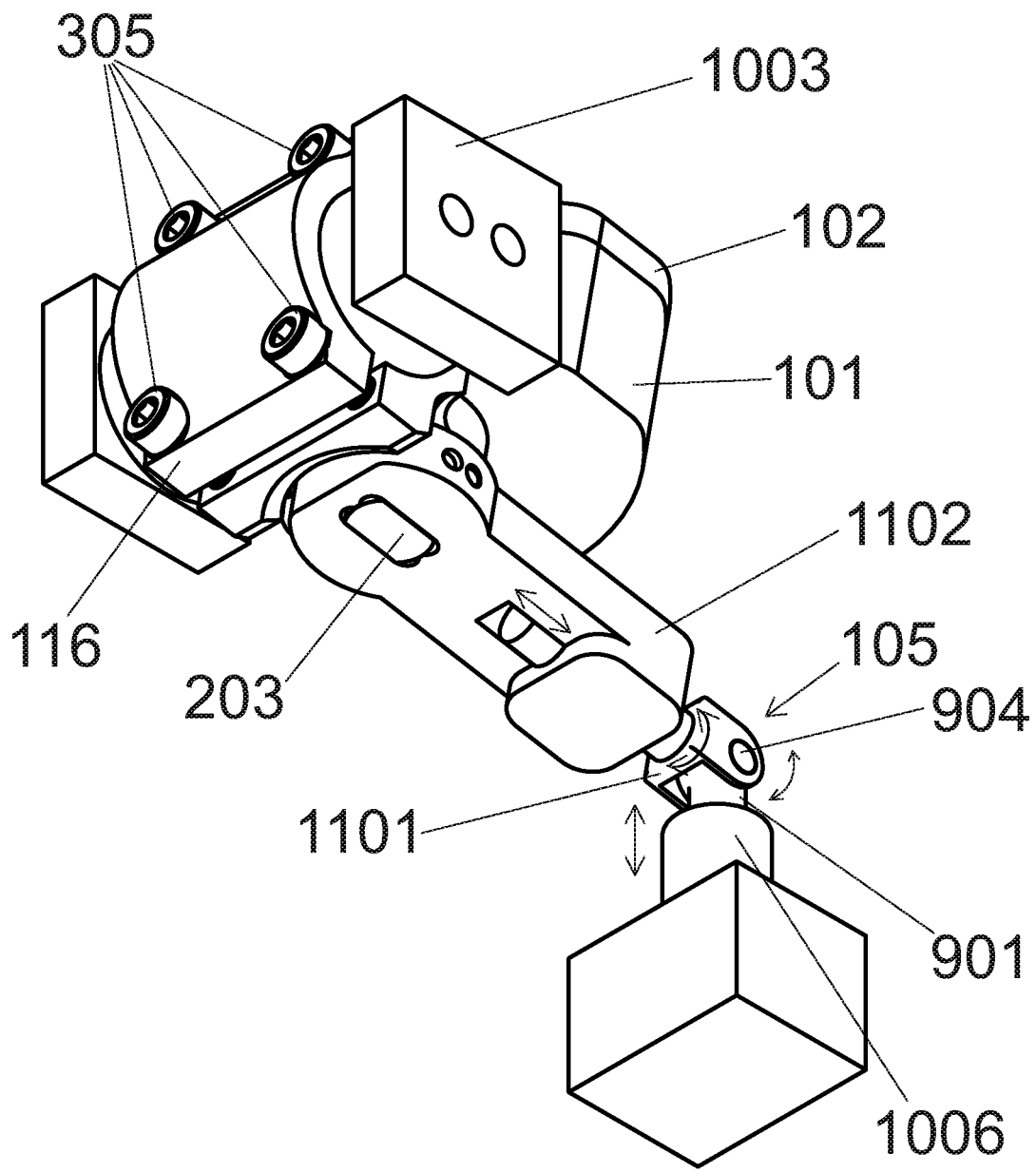
FIG. 11 is a close-up view of FIG. 10 with another alternative articulate joint connection.

The sixth embodiment is represented in FIG. 10 and FIG. 11. This embodiment employs a similar arrangement as the fourth embodiment represented schematically in FIG. 9. The changes will be described below; additional or altered parts from the first and fourth embodiment are illustrated with 4 digit part numbers beginning with 10 or 11. In this embodiment, articulate joint 105 is comprising hinged slidable dog pin 901 pivotably connected to a rotating slidable lever pin 1101 by hinge pivot pin 904 and is also rotatably and slidably connected to a rotating slidable pin lever 1102. The hinged slidable dog pin 901 has slidable connection to a solid boss 1006.

Figure 6:
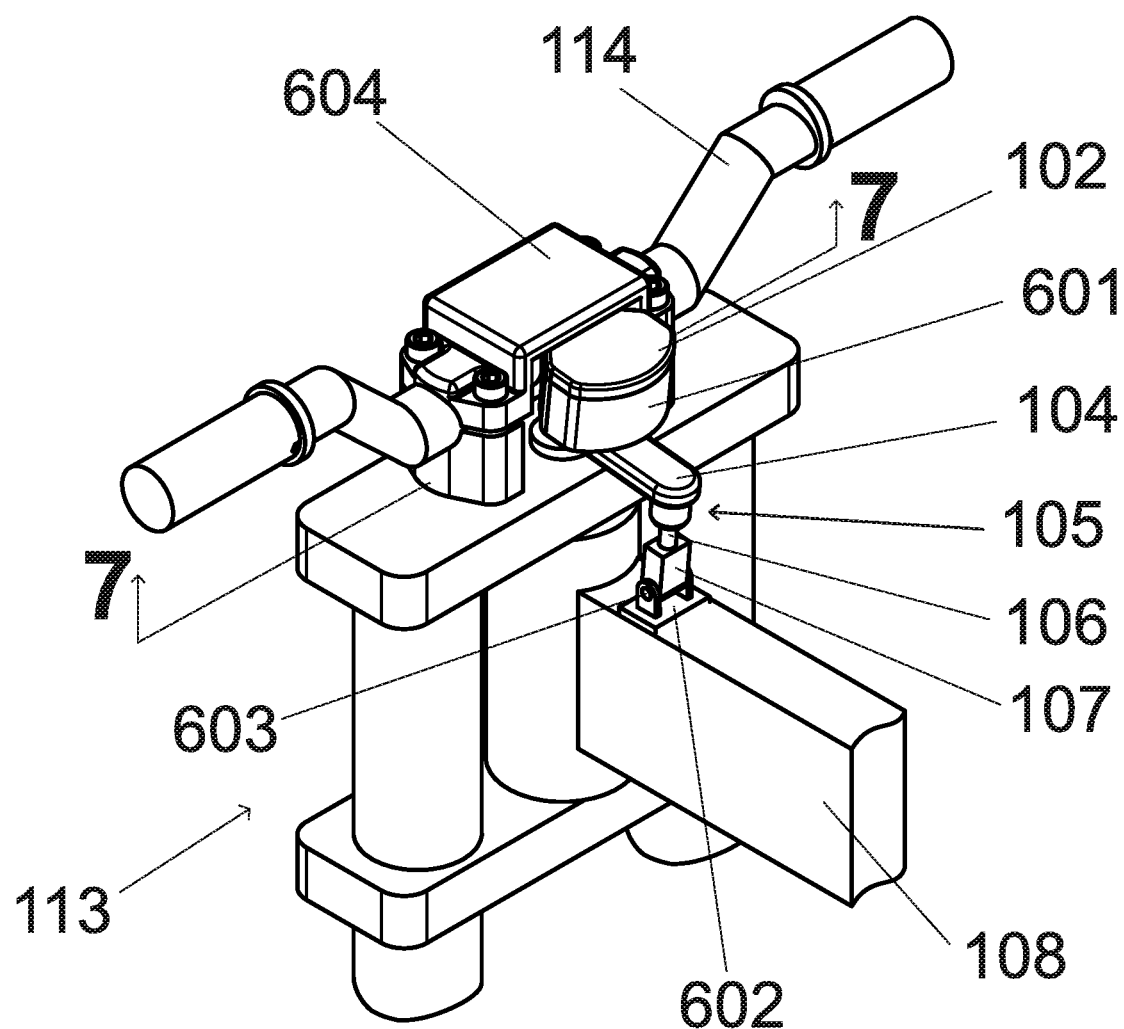
FIG. 6 is a perspective view of the single position rotary steering damper shown attached to a vehicle's handlebar and a vehicle's frame.

The seventh embodiment is represented in FIG. 6. This embodiment employs a similar arrangement as all previous embodiments. The changes will be described below; additional or altered parts are illustrated with part numbers beginning with the number 6. In this embodiment, a boss pivoting frame mount 602 is attached to the vehicle's frame 108 by high strength epoxy. Other adhesives, welding, fasteners, etc. are contemplated. In this embodiment, pivot boss 107 is pivotably connected to boss pivoting frame mount 602 by a boss pin 603 as an alternative to previous embodiments.

The eighth embodiment is represented in FIG. 10 and FIG. 11. This embodiment employs a similar arrangement as all previous embodiments. The changes will be described below, additional or altered parts are illustrated with 4 digit part numbers beginning with 10 or 11. In this embodiment, the steering damper utilizes a bracket to enable changeable positioning of the steering damper. A bracket mount 1001 set is attached to the vehicle's steering mechanism 113. This could be the bracket mount's sole purpose or, as in this embodiment, part of another component. A bracket screw 1002 set attaches bracket mount 1001 set to an adjustable bracket 1003 through a bracket hole 1004 set or a bracket slot 1005 set. In this embodiment, the steering damper can be positioned forward or backward, up or downward, or pivotably about adjustable bracket 1003, however other brackets with more or less positioning options can be used.

Figure 7:
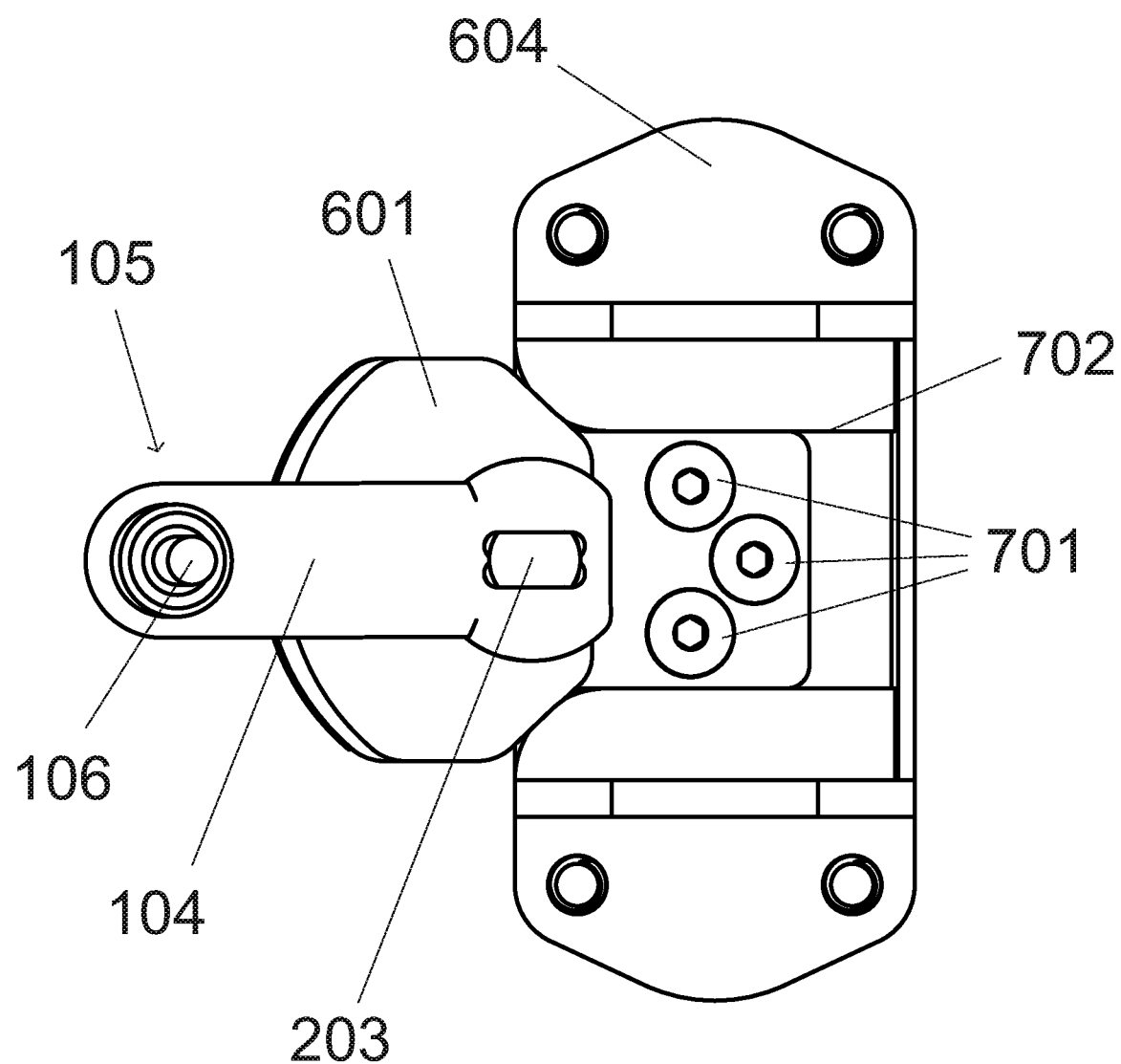
FIG. 7 is a bottom view of the steering damper in FIG. 6.

The ninth embodiment is represented in FIG. 6 and FIG. 7. This embodiment employs a similar arrangement as all previous embodiments. The changes will be described below; additional or altered parts are illustrated with part numbers beginning with the number 6 or 7. In this embodiment, a housing alternative 601 with the same internal characteristics as housing 101 is attached to a housing bracket 604 at a predetermined beneficial orientation to the vehicle's steering mechanism's axis of rotation 402 (see FIG. 4) with a bracket fastener 701 set and is positioned in a locating recess 702 for added strength. It is contemplated that housing alternative 601 and housing bracket 604 could be a single integral piece.

Figure 14:
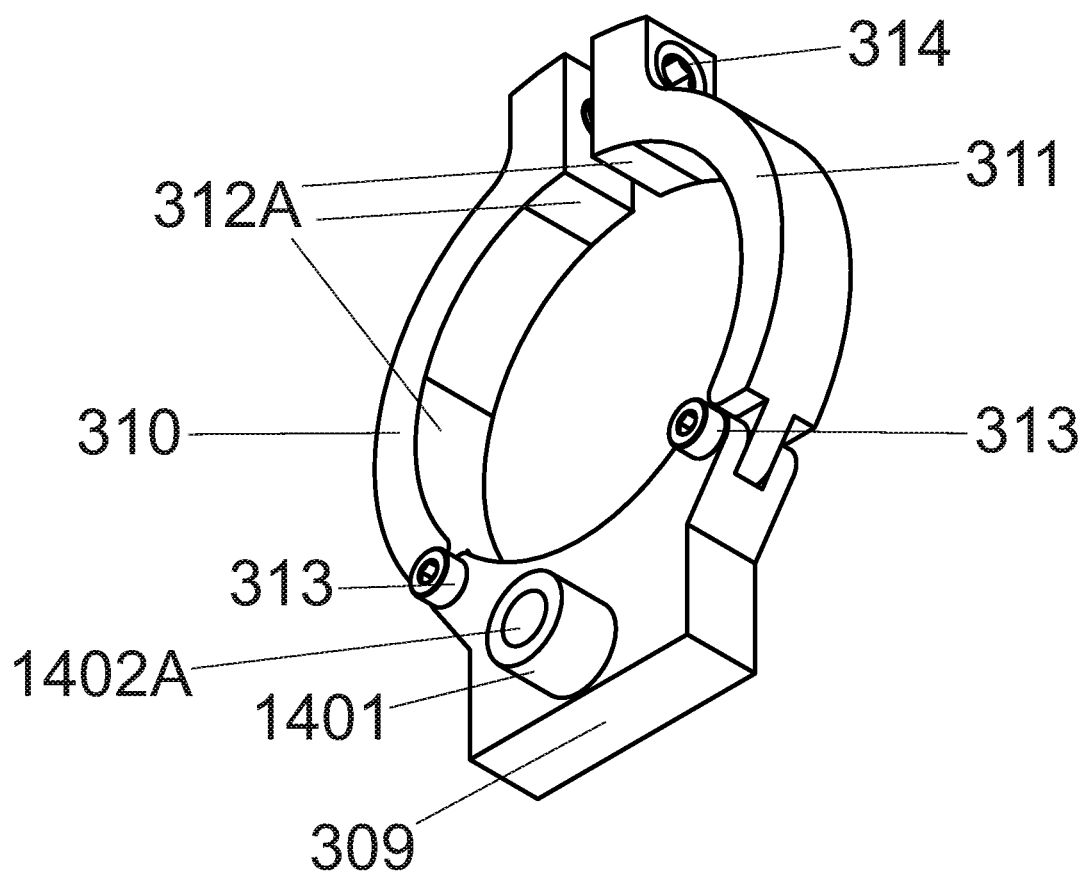
FIG. 14 is a perspective view of a hinged boss frame mount assembly with non-pivoting boss.

The tenth embodiment is represented in FIG. 14. This embodiment employs a similar arrangement as the first embodiment represented schematically in FIG. 1, FIG. 2, and FIG. 3A. The changes described below are specifically to the hinged boss frame mounting assembly 109 (see FIG. 1); additional or altered parts from the first embodiment are illustrated with 4 digit part numbers beginning with 14. In this embodiment, hinged boss frame mounting assembly 109 (see FIG. 1) is comprising a non-pivoting boss 1401 with a boss aperture 1402A used to receive the pins used to dog the steering damper. It is contemplated that boss dog pin 1201 (see FIG. 1.2) or other non-pivoting type boss could be used.

Figure 13:
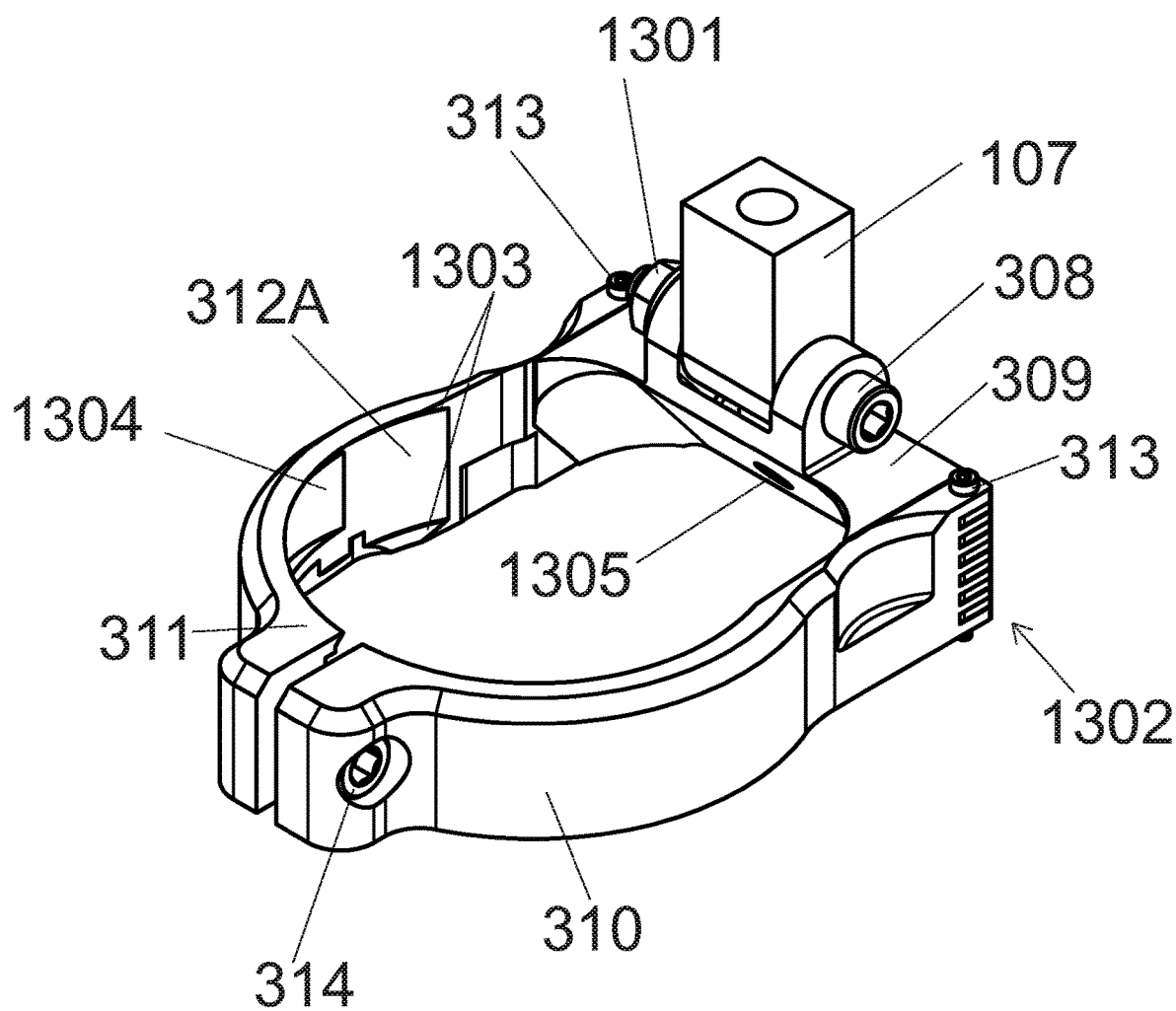
FIG. 13 is a perspective view of a hinged boss frame mount assembly.

The eleventh embodiment is represented in FIG. 13. This embodiment employs a similar arrangement as the first embodiment represented schematically in FIG. 1, FIG. 2, and FIG. 3A. The changes described below are specifically to the hinged boss frame mounting assembly 109 (see FIG. 1); additional or altered parts from the first embodiment are illustrated with 4 digit part numbers beginning with 13. In this embodiment, hinged boss frame mounting assembly 109 (see FIG. 1) is comprising pivoting boss 107 pivotably connected to center member 309 by boss pivoting screw 308 and a nut 1301. The center member 309 is connected pivotably to left member 310 and right member 311 by screw pivot 313 set forming a piano hinge 1302 set. This embodiment employs the piano hinges 1302 set for added shear strength of screw pivot 313. It is contemplated that a single or a plurality of hinges can be used. In this embodiment, left member 310, right member 311, and center member 309 have frame aperture 312A to contact the vehicle's frame with clamping forces applied by clamping screw 314. A frame recess 1304 accounts for frame imperfections or frame attributes. In this embodiment, a lip 1303 nests and or locates the vehicle's frame. It is contemplated that lip 1303 can be single or a set to nest or locate the vehicle's frame. In this embodiment, a fastener aperture 1305 is used to receive a pre-existing fastener of the vehicle's frame or to an added fastener to the vehicle's frame.

The use of the hinged boss frame mount assembly 109 allows for the addition of the steering damper's frame boss without a disassembly of the vehicle's steering mechanism 113 or the need to weld or glue the boss to the vehicle's frame 108. The clamping force is applied by clamping screw 314 to hinged members 309,310,311 with frame apertures 312A contacting the vehicle's frame 108 in a plurality of predetermined beneficial locations to better transfer the forces applied by the steering damper to the vehicle's frame 108.

The invention claimed is:

1. A rotary steering damper having an articulated connection to a vehicle steering mechanism and a vehicle frame, said damper comprising:
   a) a housing and a boss;
   b) means for attaching said housing to the steering mechanism;
   c) said housing includes a hydraulic chamber with a working fluid therein;
   d) means for containing said working fluid in said hydraulic chamber;
   e) said hydraulic chamber having a rotary vane that divides said chamber into two sub-chamber set and a passage that connects the two sub-chamber set;
   f) a metering valve capable of adjusting flow of said working fluid through said passage;
   g) said rotary vane includes a levered cylindrical shaft;
   h) means for attaching said boss to the vehicle frame; and
   i) means for articulating a connection between said levered cylindrical shaft and said boss, wherein when synchronizing a motion of said rotary vane in relation to the vehicle steering mechanism it produces dampening forces with the steering damper positioned coaxially, non-coaxially, or angularly to a vehicle steering axis.

2. The rotary steering damper of claim 1 wherein at least one internal surface of said hydraulic chamber has a set of at least one pressure relieving recess.

3. The rotary steering damper of claim 1 wherein the cylindrical shaft includes a separate lever and means for attaching the lever to the cylindrical shaft.

4. The rotary steering damper of claim 1 further comprising a dog pin, the dog pin having a first end and a second end and the first end is slidably connected to said boss.

5. The rotary steering damper of claim 4 wherein said second end includes a trochoid joint component that providing the articulated connection between the dog pin and said levered cylindrical shaft.

6. The rotary steering damper of claim 4 wherein said second end of the dog pin includes a universal joint that providing the articulated connection between the dog pin and said levered cylindrical shaft.

7. The rotary steering damper of claim 4 further comprising a rotatable hinge, said hinge is pivotally connected to the levered cylindrical shaft at one end and hingedly connected at another end to said second end of said dog pin, thus creating said articulated connection.

8. The rotary steering damper of claim 4 further comprising a rotatable hinge, said hinge is slidably and pivotally connected to the levered cylindrical shaft at one end and hingedly connected at another end to said second end of said dog pin, thus creating said articulated connection.

9. The rotary steering damper of claim 1 wherein said boss is pivotably connected to said vehicle frame.

10. The rotary steering damper of claim 1, wherein said housing has an aperture configured to receive said handlebar and means for restraining said handlebar within said aperture.

11. The rotary steering damper of claim 1 wherein a bracket connects said housing to the vehicle steering mechanism.

12. The rotary steering damper of claim 1 further comprising an adjustable bracket, the adjustable bracket connects said housing to the vehicle steering mechanism, wherein a position of a rotary vane axis of rotation relative to said vehicle steering mechanism axis of steering rotation is changeable.

13. A method for connecting a rotary steering damper to a vehicle that utilizing a handlebar assisted steering mechanism, comprising the steps:
   a) providing means for attaching the rotary steering damper to said steering mechanism at a predetermined non coaxial positioning of a rotary steering damper axis relative to a steering axis;
   b) providing a levered cylindrical shaft;
   c) providing a frame boss;

d) providing means for slidably connecting said frame boss to said levered cylindrical shaft; and e) providing means for attaching said frame boss to a vehicle frame, wherein such connection would provide the rotary steering damper to be attached to said steering mechanism at a parallel or at an angle to a steering axis, and allowing a synchronized motion between said levered cylindrical shaft and said steering mechanism.

14. The rotary steering damper of claim 13 wherein the levered cylindrical shaft has a separate lever and means for attaching the lever to the cylindrical shaft.

15. The method of claim 13 further providing a dog pin, wherein said dog pin has a first end and a second end, and the first end is slidably connected to said frame boss and the second end is in an articulated connection with said levered cylindrical shaft.

16. The method of claim 15 further providing a pin, said pin is slidably and pivotably connected to said levered cylindrical shaft at one end and hingedly connected at another end to the second end of said dog pin.

17. The method of claim 15, wherein said second end includes a trochoid joint.

18. The method of claim 15, wherein said second end includes a universal joint.

19. The method of claim 13 wherein said frame boss is configured to pivotally connected the vehicle frame.

20. A method for linking a rotary steering damper to a vehicle that utilizing a handlebar assisted steering mechanism, comprising the steps:

a) providing means for attaching the rotary steering damper to a vehicle steering mechanism at a predetermined angular positioning of a rotary steering damper axis of rotation relative to a steering mechanism axis of rotation;

b) providing a levered cylindrical shaft;

c) providing a frame boss;

d) providing means for slidably connecting said frame boss to said levered cylindrical shaft with an articulated connection;

e) providing means for attaching said frame boss to a vehicle frame; and wherein the rotary steering damper axis of rotation relative to the steering mechanism axis of rotation at an angle and rotating said rotary steering damper axis of rotation in a semi conical path provide synchronized motion of said levered cylindrical shaft with said steering mechanism.

21. The method of claim 20 wherein said cylindrical shaft has a separate lever and means for attaching the lever to said cylindrical shaft.

22. The method of claim 20 further providing a dog pin, said dog pin has a first end and a second end, said first end is slidably connected to said frame boss and said second end is in said articulated connection with said levered cylindrical shaft.

23. The method of claim 22 further providing a pin, said pin is slidably and pivotably connected to said levered cylindrical shaft at one end and hingedly connected at another end to the second end of said dog pin.

24. The method of claim 22 wherein wherein said second end includes a trochoid joint.

25. The method of claim 22 wherein said second end includes a universal joint.

26. The method of claim 20 wherein said frame boss is pivotably connected to the vehicle frame.

27. A hinged frame mount for linking a rotary steering damper to a vehicle frame, comprising:

a) a plurality of hinged members forming an aperture set configured to receive said vehicle frame;

b) means for pivotally connecting said plurality of hinged members;

c) means for applying a clamping force of said plurality of hinged members and to said vehicle frame; and wherein said hinged frame mount may be installed, without the extensive disassembly of a vehicle steering mechanism, onto said vehicle frame with contact in a plurality of predetermined locations of said vehicle frame.

28. The hinged frame mount of claim 27 wherein at least one member of said plurality of hinged members is comprising a boss.

29. The hinged frame mount of claim 28 wherein said boss is configured to pivotally connected to said plurality of hinged members.

* * * * *